United States Patent
Kunc et al.

(10) Patent No.: US 8,867,989 B2
(45) Date of Patent: Oct. 21, 2014

(54) METHOD FOR REDUCING A NOISE IN A SIGNAL RECEIVED IN A CONTACTLESS-CARD INTERROGATOR AND A CIRCUIT TO PERFORM SAID METHOD

(75) Inventors: Vinko Kunc, Ljubijana (SI); Andrej Vodopivec, Ljubijana (SI); Maja Atanasijevic-Kunc, Ljubijana (SI); Anton Stern, Preddvor (SI)

(73) Assignee: AMS International AG, Rapperswil (CH)

( * ) Notice: Subject to any disclaimer, the term of this patent is extended or adjusted under 35 U.S.C. 154(b) by 1043 days.

(21) Appl. No.: 12/736,504

(22) PCT Filed: Apr. 15, 2008

(86) PCT No.: PCT/SI2008/000025
§ 371 (c)(1),
(2), (4) Date: Oct. 14, 2010

(87) PCT Pub. No.: WO2009/128791
PCT Pub. Date: Oct. 22, 2009

(65) Prior Publication Data
US 2011/0032080 A1    Feb. 10, 2011

(51) Int. Cl.
H04B 5/00      (2006.01)
G06K 7/00      (2006.01)

(52) U.S. Cl.
CPC .................................... G06K 7/0008 (2013.01)
USPC ....................................................... 455/41.1

(58) Field of Classification Search
USPC ....................................................... 455/41.1
See application file for complete search history.

(56) References Cited

U.S. PATENT DOCUMENTS

2006/0186995 A1 *  8/2006  Wu et al. ...................... 340/10.1

FOREIGN PATENT DOCUMENTS

| CN | 1948977 A | 4/2007 |
| CN | 101014964 A | 8/2007 |

* cited by examiner

*Primary Examiner* — Ankur Jain
(74) *Attorney, Agent, or Firm* — McDermott Will & Emery LLP

(57) ABSTRACT

A calibrating output signal of the transmitter is generated in an interrogator in that a first output signal of a local oscillator is shallowly amplitude-modulated with a pilot signal having a frequency at which a contactless-card encodes data. A receiver reference signal is generated by combining the calibrating output signal of the transmitter and a signal whose carrier signal has a frequency equaling the frequency of the local oscillator signals, conducting the combined signal through a band-pass filter and amplifying it. A first and a second receiver output signals are cleared by subtracting the receiver reference signal, which has been attenuated by a calibrated factor and has a calibrated polarity, from the first and the second receiver output signal, respectively. The attenuation factor and the polarity of the receiver reference signal are sporadically calibrated for each of both receiver output signals by determining and setting the attenuation factor and the polarity of the receiver reference signal as a pair of values for each of both receiver output signals, at which pair of values the first and the second cleared receiver output signals have the lowest amplitude. The signal-to-noise ratio for the interrogator receiver output signal is improved, because this signal no longer contains an amplitude noise of the interrogator transmitter.

18 Claims, 3 Drawing Sheets

METHOD FOR REDUCING A NOISE IN A SIGNAL RECEIVED IN A CONTACTLESS-CARD INTERROGATOR AND A CIRCUIT TO PERFORM SAID METHOD

This is a national stage of PCT/SI08/000,025 filed Apr. 15, 2008 and published in English, hereby incorporated by reference.

The invention concerns a method and a circuit for reducing a noise in a signal received in a contactless-card interrogator, in which a transmitter-receiver module is connected both to an interrogator transmitter and an interrogator receiver, and two receiver output signals are generated by combining a receiver input signal and an output signal of a local oscillator or a signal in quadrature thereto, conducting the combined signals through a band-pass filter to be cleared of high-frequency noise components and a direct-current component, and amplifying them, whereafter a stronger one of said receiver output signals is selected, digitized and conducted to a communication controller, the proposed solution being mainly used for a contactless-card interrogator in the UHF band.

A demodulation of a received signal in the UHF band having frequencies of about 900 MHz being transmitted by a contactless-card and received by an interrogator antenna is mostly carried out by combining with two local oscillator output signals which are in quadrature to each other (US 2006/0186995 A1) in order for signal to be received to be efficiently received irrespective of whether it is amplitude-modulated or phase-modulated in a region of the antenna. Thereafter, the demodulated signals are cleared of high-frequency noise components and a direct-current component and amplified. The stronger of both signals is selected, digitized and conducted to a communication controller. Since a coupling circuit in the interrogator connects a transmitter to the antenna and the antenna to a receiver, and the interrogator must transmit a carrier signal of the transmitter also when receiving a contactless-card signal in order to deliver a supply energy flux to the contactless-card, a noise of the transmitter carrier signal contained within the received contactless-card signal is transferred to the interrogator receiver besides other noise, as well.

A noise inherent in an electronic circuit of the receiver, when calculated with respect to its input, generates an effective voltage of 5 nV per 1 Hz wide frequency band in the mentioned frequency range but a noise of a high-class signal generator is typically −120 dBc meaning an effective voltage 220 nV per 1 Hz wide frequency band (on 50Ω) at a power of 1 mW. Said carrier signal at the output of the interrogator transmitter has power ranging from 100 mW to 1 W. The noise of the transmitter carrier signal is a significant or even prevailing noise in the interrogator receiver, because the electronic circuit can be produced therein in said frequency range in such manner that it will have a low noise.

However, this estimation has to be improved for a signal reception in an interrogator. The noise of a transmitter carrier signal is composed of a phase noise and an amplitude noise. The phase noise of the transmitter carrier signal does not contribute to a noise in the receiver, because two input mixer stages use two output signals in quadrature to each other of the same local oscillator which also generates the transmitter carrier signal. The amplitude noise of the transmitter carrier signal, however, strongly contributes to a noise in the receiver whereat a transfer factor is determined by a difference in the phase of said signal and either of both signals being in quadrature to each other.

The above statement is illustrated by means of simulations represented in FIGS. 1a, 1b, 1c and 1d. Each of said Figures represents one of two local oscillator output signals being in quadrature to each other in window I, an input signal of an interrogator receiver in window II, a signal at an output of an interrogator mixer stage in window III and the signal from window III cleared of high-frequency noise components in window IV.

The input signal of the interrogator receiver and one of two local oscillator output signals being in quadrature to each other are represented in FIG. 1a being in phase; the cleared amplitude-demodulated signal in window IV proves that an amplitude-demodulation produces a significant received signal. The input signal of the interrogator receiver and the second one of the two local oscillator output signals being in phase quadrature to each other in FIG. 1b are in quadrature to each other; the cleared amplitude-demodulated signal in window IV proves that the amplitude-demodulation does not produce a satisfactory received signal in this case.

FIGS. 1c and 1d represent an effect of phase-demodulation of the input signal of the interrogator receiver, which signal is phase-modulated with a signal having a frequency 5 MHz, for the case of combining it with the first one of the two local oscillator output signals being in quadrature to each other, which first signal is in quadrature to the input signal or for the case of combining it with the second one of the two local oscillator output signals being in quadrature to each other, which second signal is in phase with respect to the input signal.

The technical problem to be solved by the present invention is to propose such method and such circuit by means of which a dominant portion of the amplitude noise within an input signal of an interrogator receiver is determined without delay and is thereafter subtracted from a signal the interrogator has received from a contactless-card.

Said technical problem is solved by a method of the invention as characterized by features of the characterizing portion of the first claim and by a circuit of the invention as characterized by features of the characterizing portion of the ninth claim, the variants of the embodiment of the method and the circuit being characterized by dependent claims.

The advantage of the method and of the circuit of the invention for reducing a noise in a signal received in a contactless-card interrogator exists in that an amplitude noise of an interrogator transmitter is no longer present in a signal at an output of a communication controller and hereby a signal-to-noise ratio for the mentioned output signal is significantly improved.

The invention will now be disclosed in detail by way of describing embodiments of the method and of the circuit of the invention and with reference to the accompanying drawing representing in:

Figure 1A:
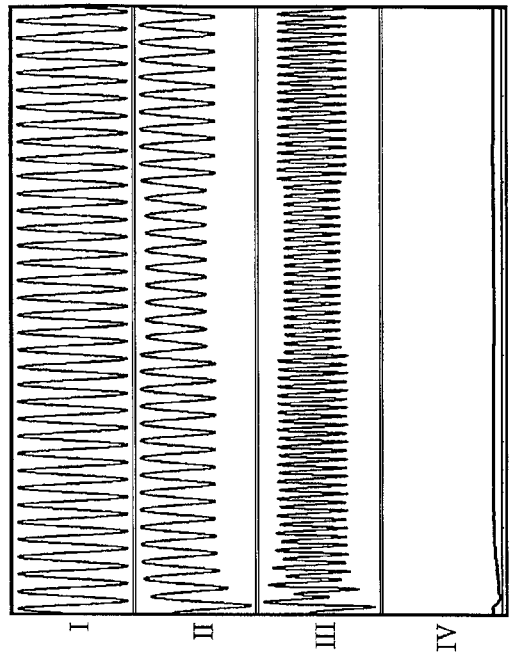
FIG. 1(a) depicts one of two local oscillator output signals being in quadrature and in phase in window I; an input signal of an interrogator receiver in window II; an output signal of an interrogator mixer stage in window III; and the window III signal cleared of high frequency components in window IV.
Figure 1B:
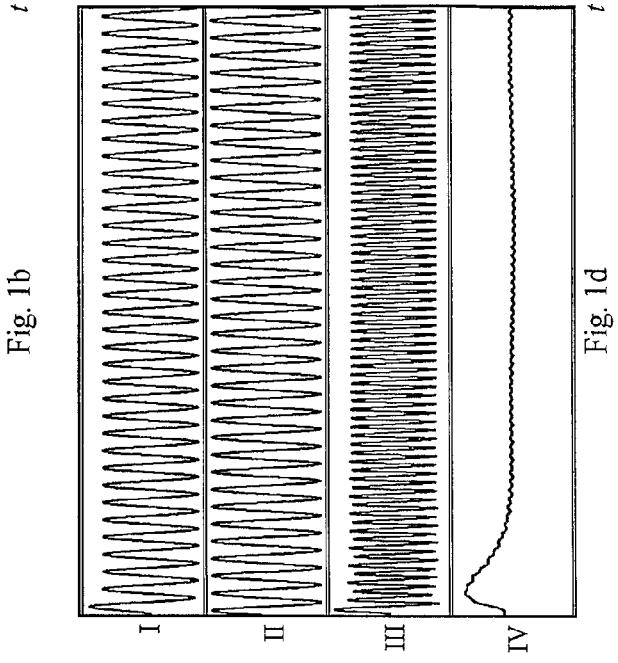
FIG. 1(b) depicts windows I through IV as described in FIG. 1(a) but for the second of two local oscillator output regards in quadrature to each other.
Figure 1C:
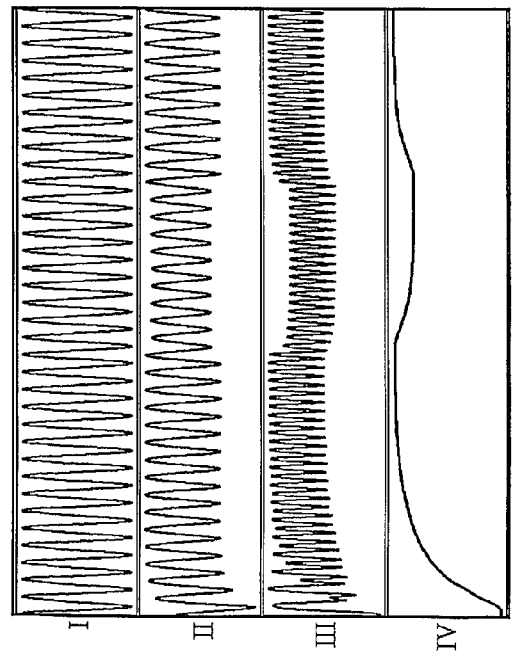
Figure 1D:
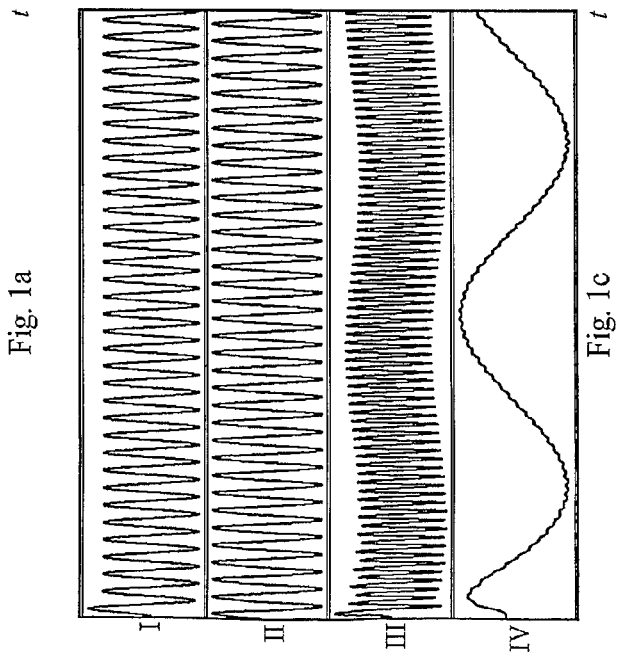

FIGS. 1(c) and 1(d) depicts an effect of phase—demodulation of the input signal of the interrogator receiver.

Figure 2:
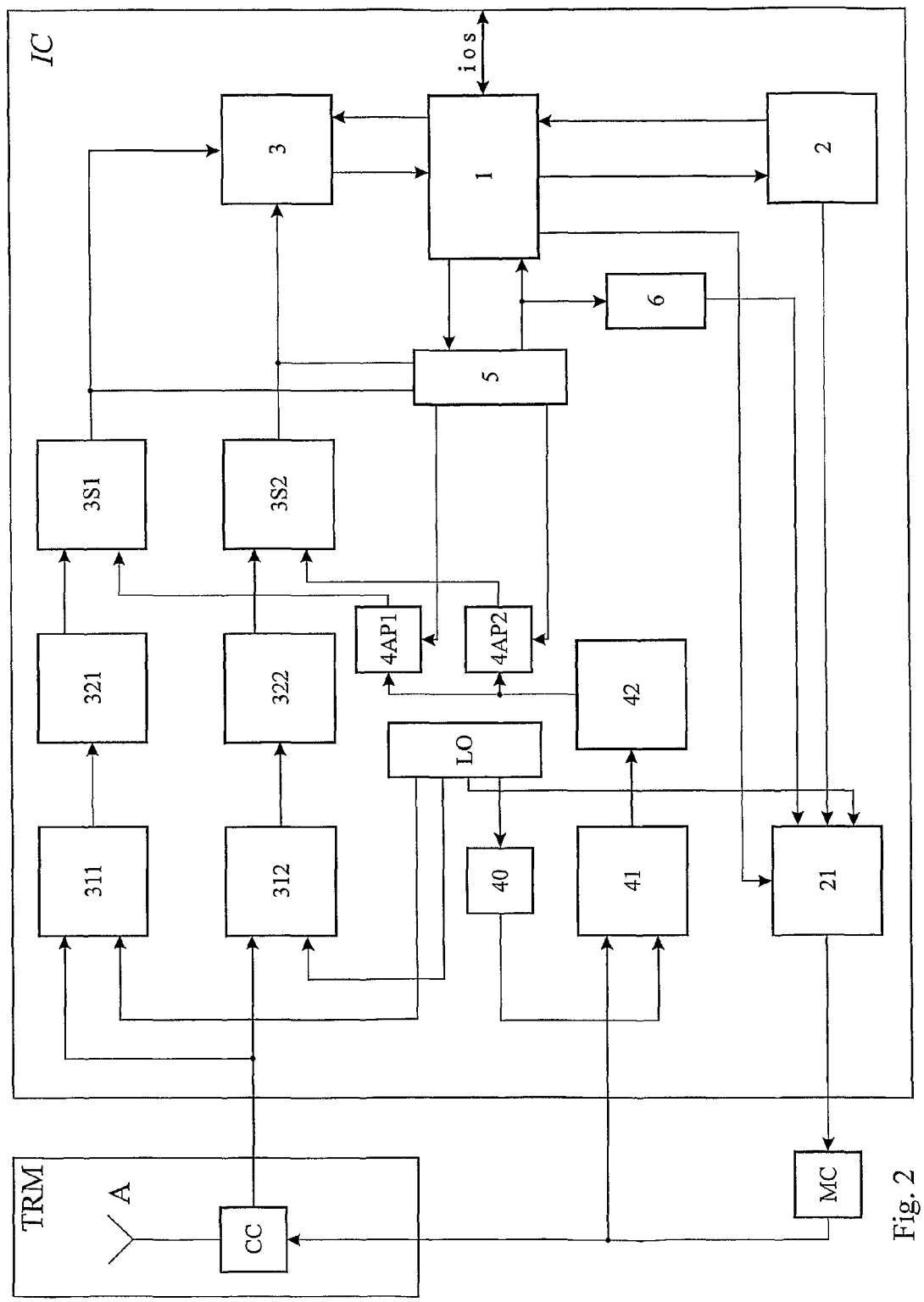
Figure 3:
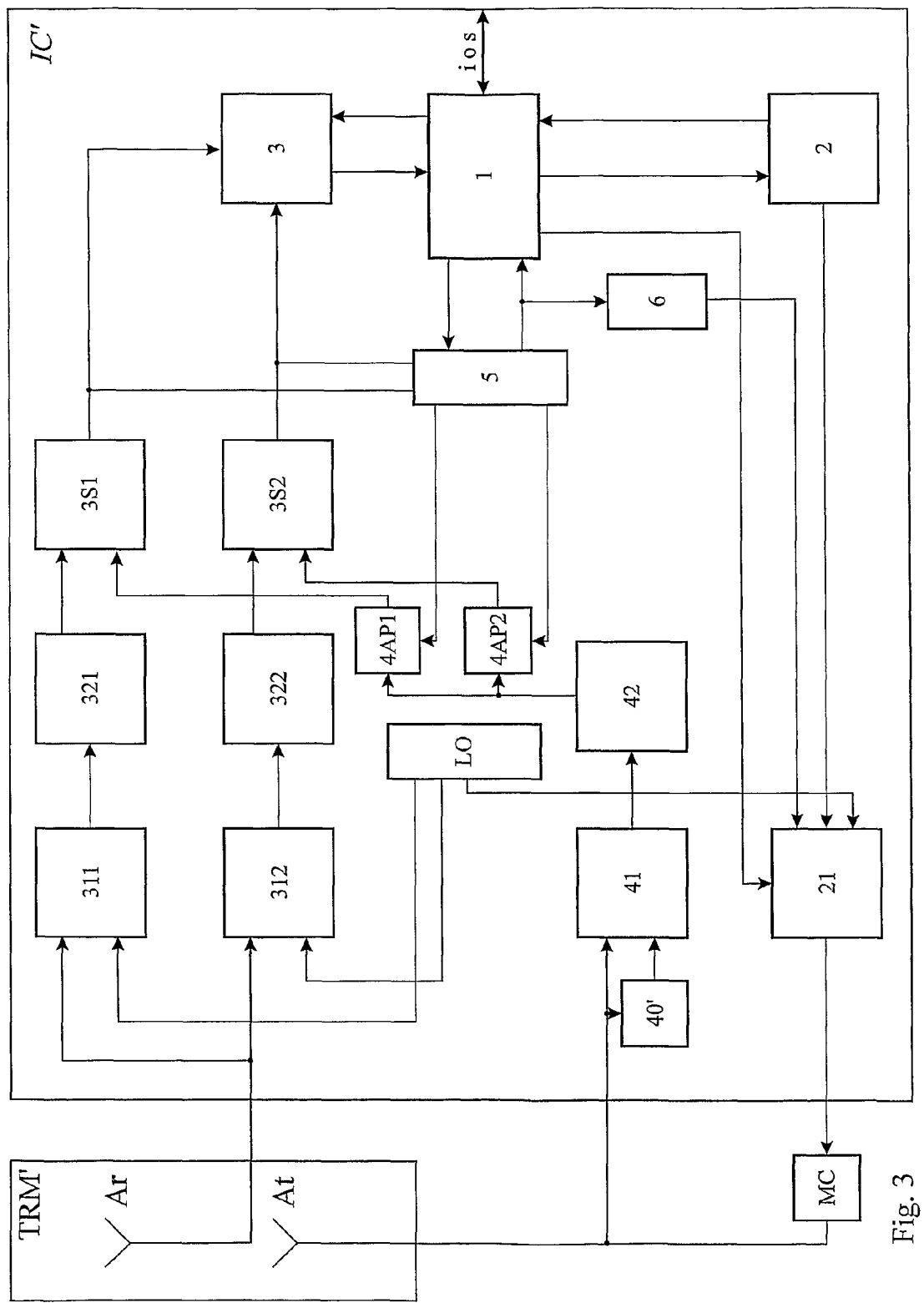

FIGS. 2 and 3 represents variants of an embodiment of the circuit of the invention for reducing a noise in a signal received in a contactless-card interrogator.

The method of the invention for reducing a noise in a received signal is carried out in a contactless-card interrogator in which a transmitter-receiver module TRM; TRM' is connected both to an interrogator transmitter and an interrogator receiver (FIGS. 2 and 3). An interrogator local oscillator LO generates several output signals all having the same frequency; a first output signal is a carrier signal of a transmitter output signal. A receiver input signal is parallelly processed in two paths. A first receiver output signal is generated by combining the receiver input signal and a second output signal of the local oscillator LO, conducting the combined signal through a band-pass filter 321, where a direct-current component is eliminated and a portion of high-frequency noise components is strongly reduced, and amplifying it. A second receiver output signal is generated by combining the receiver input signal and a third output signal of the local oscillator LO being in quadrature to the second output signal of the local oscillator LO, conducting the combined signal through a band-pass filter 322 and amplifying it. The stronger of the first and the second receiver output signals is selected and digitized. The resulting signal is then conducted to a communication controller 1 which receives input signals and transmits output signals ios and communicates with a transmitter digital-to-analogue converter 2.

The method of the invention for reducing the noise in the signal received in the contactless-card interrogator is characterized by the following steps.

A calibrating output signal of the transmitter is generated in that the first output signal of the local oscillator LO is shallowly—in the order of magnitude of 1%—amplitude-modulated with a pilot signal. The pilot signal frequency should equal the frequency at which the contactless-card encodes data.

A receiver reference signal is generated in the interrogator by combining the calibrating output signal of the transmitter and a signal, whose carrier signal has a frequency equaling the frequency of the output signals of the local oscillator LO, conducting the combined signal through a band-pass filter 42 and amplifying it.

Here, the mentioned signal may be a fourth output signal of the local oscillator LO, whose phase is set in an appropriate way, so that its phase at an input of an auxiliary mixer stage 41 equals a phase of the calibrating output signal of the transmitter at the input of the auxiliary mixer stage 41 and a maximum effect of the amplitude demodulation is achieved; or the mentioned signal may simply be the calibrating output signal of the transmitter with a changed amplitude.

Then, the first and the second receiver output signals are cleared by subtracting the receiver reference signal, which has been attenuated by a calibrated factor and has been given a calibrated polarity of the first or the second receiver output signal, from the first and the second receiver output signal, respectively.

The attenuation factor and the polarity of the receiver reference signal for each of both receiver output signals are sporadically recalibrated or whenever the conditions on the antenna or in the space around the antenna have substantially changed.

The calibration of the attenuation factor of the receiver reference signal and its polarity for each of both receiver output signals is carried out in steps as contained in the following instruction.

The attenuation factor of the receiver reference signal and its polarity for each one of both receiver output signals are determined and set as that pair of the calibrated values at which the first as well as the second cleared receiver output signal has the lowest amplitude.

The method of the invention for reducing the noise in the signal received is carried out in the contactless-card interrogator, provided with the transmitter-receiver module TRM or TRM'.

The transmitter-receiver module TRM comprises a coupling circuit CC and a transmitting and receiving antenna A (FIG. 2). Here a directional coupler, a circulator or a discrete circuit provided for separating the received signal and the transmitter carrier signal may be used as the coupling circuit CC.

The transmitter-receiver module TRM' comprises a transmitting antenna At, which is connected to the output of the interrogator transmitter, and a receiving antenna Ar, which is connected to the input of the interrogator receiver (FIG. 3).

A directional coupler e.g. attenuates the transmitter output signal in direction from the antenna towards the interrogator receiver much more strongly than the signal received from the contactless-card. A contribution of the noise from the transmitter output signal in the input signal of the interrogator receiver is thus reduced in this way by 20 dB to 30 dB, yet this contribution is still prevailing.

The circuit of the invention for reducing the noise in the received signal is produced on a chip IC or IC' of the contactless-card interrogator. The transmitter-receiver module TRM or TRM' may be used on the chip IC or the chip IC' and is connected both to an output of a transmitter amplitude modulator 21, usually through a matching circuit MC, and to a first input of a first and a second receiver mixer stages 311, 312.

The first output signal of the local oscillator LO is conducted as the carrier signal of the transmitter output signal to a first input of the transmitter amplitude modulator 21. All output signals of the local oscillator LO have the same frequency. A modulation signal from a digital-to-analogue converter 2 is conducted to a second input of the transmitter amplitude modulator 21.

The second and the third output signal of the local oscillator LO being in quadrature to each other are conducted to a second input of said first and second receiver mixer stage 311, 312, respectively.

Output signals of said first and second receiver mixer stages 311, 312 are conducted through a first and a second band-pass filter and an amplifier 321, 322 to a first and a second input of a selection-digitalization circuit 3, respectively. Said selection-digitalization circuit 3 is connected to a communication controller 1.

The circuit for reducing the noise in the signal received in the contactless-card interrogator is provided, as proposed by the invention, also with an auxiliary mixer stage 41, an auxiliary band-pass filter and an amplifier 42, a controlled first and a second circuit 4AP1, 4AP2 for attenuation and polarity setting, a first and a second subtractor 3S1, 3S2, a correction circuit 5 and a pilot-signal generator 6. The circuit of the invention is characterized by the following connections.

The transmitter output signal, which is tapped off in front of or behind the matching circuit MC or even behind the coupling circuit CC and may even be attenuated if necessary in order not to exceed the dynamic range of the input of the auxiliary mixer stage 41, is conducted to a first input of the auxiliary mixer stage 41. To its second input a signal is conducted whose carrier signal has a frequency of the output signal of the local oscillator LO. Said signal is either the fourth output signal of the local oscillator LO, which signal may be conducted through a phase shifter 40 to a second input of the auxiliary mixer stage 41, or the transmitter output signal which is supplied through a circuit 40' for setting the amplitude of the transmitter output signal.

An output of the auxiliary mixer stage 41 is connected to the input of the circuit 42 representing the auxiliary band-pass filter and the amplifier. A demodulated transmitter output signal containing low-frequency components of the transmitter noise is present at an output of the circuit 42. A demodulated contactless-card signal is, strictly speaking, also present at the output of the circuit 42 representing the auxiliary band-pass filter and the amplifier, yet rather weak when compared to the demodulated low-frequency components of the transmitter noise.

An output of the auxiliary band-pass filter and the amplifier circuit 42 is connected through the first and the second controlled attenuating and polarity setting circuit 4AP1, 4AP2 to a second input of the first and the second subtractors 3S1, 3S2, respectively. An output of the first and the second band-pass filter and amplifier 321, 322 is connected to a first input of the subtractor 3S1 and 3S2, respectively.

On the one hand an output of either subtractor 3S1 and 3S2 is connected to a first and a second input of the selection-digitalization circuit 3, respectively, and on the other hand to a first and a second input of the correction circuit 5, respectively.

The correction circuit 5 controls the attenuating and polarity setting circuits 4AP1, 4AP2 in a manner that the first and the second receiver output signals, respectively, are optimally cleared also of low-frequency components of the demodulated amplitude noise of the transmitter output signal by means of the receiver reference signal from the output of the auxiliary band-pass filter and amplifier circuit 42 the receiver reference signal being scaled in an appropriate way described below.

The correction circuit 5 controls the pilot-signal generator 6, as well. The pilot signal frequency equals the frequency, at which the contactless-card encodes data. An output of the pilot-signal generator 6 is connected to a second input of the interrogator transmitter amplitude modulator 21, said second input being provided for a modulating signal to be combined with the first output signal of the local oscillator LO. Moreover, the transmitter amplitude modulator 21 is controlled by the communication controller 1.

When the correction circuit 5 has triggered the pilot signal generation, it also starts to observe the first and the second cleared receiver output signal and controls a setting of the attenuating and polarity setting circuits 4AP1, 4AP2, until it detects a minimum of the first and the second cleared receiver output signals. The circuit of the invention is thus calibrated. The correction circuit 5 freezes this setting and turns off the pilot-signal generator 6. The contactless-card interrogator is now prepared for an operation.

Hence, the signal-to-noise ratio for the signal ios at the output of the communication controller 1 is significantly improved by the method and the circuit of the invention.

Should the impedance of the receiving antenna A; Ar change, or the receiving conditions are considerably changed due to different reflections of radio waves, or if the frequency range of the contactless-card signal is different from the expected one and in similar changed circumstances, the correction circuit 5 triggers the calibration action again.

The invention claimed is:

1. A method for reducing a noise in a signal received in a contactless-card interrogator
   in which a transmitter-receiver module is connected both to an interrogator transmitter and an interrogator receiver, and
   a carrier signal of a transmitter output signal is a first output signal of a local oscillator, all output signals of the local oscillator having a same frequency, and
   a first receiver output signal is generated by combining a receiver input signal and a second output signal of the local oscillator, conducting the combined signal through a band-pass filter and amplifying it, and
   a second receiver output signal is generated by combining the receiver input signal and a third output signal of the local oscillator being in quadrature to the second output signal of the local oscillator, conducting the combined signal through a band-pass filter and amplifying it, and
   a stronger one of said receiver output signals is selected, digitized and conducted to a communication controller, characterized in
   that a calibrating output signal of the interrogator transmitter is generated in that the first output signal of the local oscillator is shallowly amplitude-modulated with a pilot signal, that a receiver reference signal is generated by combining the calibrating output signal of the interrogator transmitter and a signal,
   whose carrier signal has a frequency equaling the frequency of the local oscillator signals, conducting the combined signal through a band-pass filter and amplifying it,
   that the first and the second receiver output signals are cleared
   by subtracting the receiver reference signal, which has been attenuated by a calibrated factor and has a calibrated polarity,
   from the first and the second receiver output signals, respectively,
   and that an attenuation factor and a polarity of the receiver reference signal are sporadically calibrated for each of both receiver output signals
   by determining and setting the attenuation factor and the polarity of the receiver reference signal as a pair of values for each of both receiver output signals,
   at which pair of values the first as well as the second cleared receiver output signals have a lowest amplitude.

2. The method as recited in claim 1, characterized in that a pilot signal frequency equals a frequency, at which the contactless-card encodes data.

3. The method as recited in claim 2, characterized in that the attenuation factor and the polarity of the receiver reference signal are recalibrated for each of both receiver output signals, whenever conditions on an antenna or in a space around the antenna have considerably changed.

4. The method as recited in claim 3, characterized in that the receiver reference signal is generated by combining the transmitter output signal and a fourth output signal of the local oscillator.

5. The method as recited in claim 3, characterized in that the receiver reference signal is generated by combining the transmitter output signal and the transmitter output signal with a changed amplitude.

6. The method as recited in claim 4, characterized in that a phase of the fourth output signal of the local oscillator is set.

7. The method as recited in claim 4, characterized in that the transmitter-receiver module comprises a coupling circuit and a transmitting and receiving antenna.

8. The method as recited in claim 4, characterized in that the transmitter-receiver module comprises a transmitting antenna and a receiving antenna.

9. A circuit for reducing a noise in a signal received in a contactless-card interrogator,
   in which a transmitter-receiver module is connected both to an output of an interrogator transmitter amplitude modulator whereto a first output signal of a local oscillator as a carrier signal of a transmitter output signal is conducted and to a first input of a first and a second receiver mixer stages whereat a second and a third output signal of the local oscillator being in quadrature to each other are conducted to a second input of said first and second receiver mixer stages, respectively, and all output signals of the local oscillator have a same frequency, and output signals of said first and second receiver mixer stage are conducted through a first and a second band-pass filter and an amplifier, respectively, to a first and a second input of a selection-digitalization circuit, respectively, which selection-digitalization circuit is connected to a communication controller which is connected to a digital-to-analogue converter, whose output is connected to a first input of the interrogator transmitter amplitude modulator said first input being provided for a modulating signal to be combined with the first output signal of the local oscillator, characterized in that a transmitter output signal is conducted to a first input of an auxiliary mixer stage to whose second input a signal is conducted, whose carrier signal has a frequency of the local oscillator output signal, and whose output is connected to an input of an auxiliary band-pass filter and an amplifier, that an output of the auxiliary band-pass filter and amplifier is connected through a first and a second controlled attenuating and polarity setting circuit to a second input of a first and a second subtractor, respectively, to whose first input an output of the first and the second band-pass filter and amplifier, respectively, is connected and whose output is connected to the first and the second input of the selection-digitalization circuit, respectively, that outputs of the first and the second subtractors are connected to a first and a second input of a correction circuit, respectively, which controls the first and the second controlled attenuating and polarity setting circuits and a pilot-signal generator whose output is connected to a second input of the interrogator transmitter amplitude modulator, said second input being provided for a modulating signal to be combined with the first output signal of the local oscillator and that the correction circuit is connected to the communication controller, which controls the interrogator transmitter amplitude modulator.

10. The circuit as recited in claim 9, characterized in that a pilot signal frequency equals a frequency, at which the contactless-card encodes data.

11. The circuit as recited in claim 10, characterized in that a fourth output signal of the local oscillator is conducted to the second input of the auxiliary mixer stage.

12. The circuit as recited in claim 10, characterized in that the transmitter output signal is conducted through a signal-amplitude setting circuit to the second input of the auxiliary mixer stage.

13. The circuit as recited in claim 11, characterized in that the fourth output signal of the local oscillator is conducted through a phase shifter to the second input of the auxiliary mixer stage.

14. The circuit as recited in claim 11, characterized in that the transmitter-receiver module comprises a coupling circuit and a transmitting and receiving antenna.

15. The circuit as recited in claim 11, characterized in that the transmitter-receiver module comprises a transmitting antenna and a receiving antenna.

16. The circuit as recited in claim 14, characterized in that the coupling circuit is a directional coupler.

17. The circuit as recited in claim 14, characterized in that the coupling circuit is a circulator.

18. The circuit as recited in claim 14, characterized in that the coupling circuit is a discrete circuit provided for separating the received signal and the transmitter carrier signal.

* * * * *